United States Patent
Richardson, Jr.

(10) Patent No.: US 11,581,721 B2
(45) Date of Patent: Feb. 14, 2023

(54) TWISTER SLIDER ANTIGALLOPING DEVICE

(71) Applicants: AR Patents, LLC, Lexington, MA (US); Elaine M. Richardson, Lexington, MA (US)

(72) Inventor: Albert S. Richardson, Jr., Lexington, MA (US)

(73) Assignee: AR PATENTS, LLC, Lexington, MA (US)

( * ) Notice: Subject to any disclaimer, the term of this patent is extended or adjusted under 35 U.S.C. 154(b) by 0 days.

(21) Appl. No.: 17/718,727

(22) Filed: Apr. 12, 2022

(65) Prior Publication Data

US 2022/0239088 A1 Jul. 28, 2022

Related U.S. Application Data

(62) Division of application No. 15/545,228, filed as application No. PCT/US2017/019863 on Feb. 28, 2017, now Pat. No. 11,469,582.

(51) Int. Cl.
*H02G 7/14* (2006.01)
*H02G 1/02* (2006.01)

(52) U.S. Cl.
CPC ............... *H02G 7/14* (2013.01); *H02G 1/02* (2013.01)

(58) Field of Classification Search
CPC ............ H02G 1/02; H02G 7/053; H02G 7/12; H02G 7/125; H02G 7/14
See application file for complete search history.

(56) References Cited

U.S. PATENT DOCUMENTS 3,597,522 A * 8/1971 Kobayashi ............... H02G 7/14
174/12 R
3,904,811 A * 9/1975 Otsuki ................... H02G 7/125
174/42

(Continued)

FOREIGN PATENT DOCUMENTS

CA  1079373 A  6/1980
CA  2976240    6/2021

OTHER PUBLICATIONS

AR Twister|Sliderby AR Patents, all pages (Year: 2015).*

(Continued)

*Primary Examiner* — Timothy J Thompson
*Assistant Examiner* — John B Freal
(74) *Attorney, Agent, or Firm* — Hamilton, Brook, Smith & Reynolds, P.C.

(57) ABSTRACT

The present invention can provide a twisting antigalloping device for securing to a span of a cable for torsionally twisting the cable, and includes a grip or clamp portion having a grip or clamp axis for gripping or clamping to the cable along the clamp axis. A variable weight portion can be connected to the clamp portion and extend along a variable weight axis offset from the clamp axis. The variable weight portion can include an elongate member with a plurality of individual weights secured on the elongate member. The number of individual weights in the variable weight portion can be a whole number chosen to approximate a calculated value for the number of individual weights $N_c$ given by the equation $N_c$=Function (K, $\Theta$, $W_{ND}$, $W_{SW}$) where K is an estimated mid-span stiffness of the span of the cable, $\Theta$ is a desired torsional twist angle to be applied to the cable, $W_{ND}$ is a nominal weight of the antigalloping device without the individual weights of the variable weight portion, and $W_{SW}$ is a weight of a single individual weight, the chosen number (Continued)

of individual weights for providing the antigalloping device with a total weight $W_T$ for applying the desired torsional twist angle $\Theta$ on the cable.

16 Claims, 11 Drawing Sheets

(56) References Cited

U.S. PATENT DOCUMENTS

| | | | |
|---|---|---|---|
| 4,777,327 A | 10/1988 | Richardson, Jr. | |
| 5,721,393 A | 2/1998 | Richardson, Jr. | |
| 6,008,453 A | 12/1999 | Richardson, Jr. | |
| 2014/0144673 A1* | 5/2014 | Richardson, Jr. | H02G 7/125 29/428 |
| 2014/0311765 A1 | 10/2014 | Richardson | |
| 2015/0171610 A1 | 6/2015 | Richardson | |

OTHER PUBLICATIONS

AR Products "AR® Twister/Slider" [online] [retrieved May 1, 2017], Retrieved from Internet <URL:http://www.arproducts.org/linked/twister_slider_tech_sheet2015.pdf>.
Notification of Transmittal of the International Search Report and the Written Opinion of the International Searching Authority, or the Declaration, Application No. PCT/US2017/019863, filed Feb. 28, 2017, dated May 24, 2017.
International Preliminary Report on Patentability for PCT/US2017/019863 dated Sep. 3, 2019.
Requirement for Restriction for U.S. Appl. No. 15/545,228, dated Apr. 4, 2022.
Notice of Allowance for U.S. Appl. No. 15/545,228, entitled: Twister Slider Antigalloping Device, dated Jul. 11, 2022.

* cited by examiner

TWISTER SLIDER ANTIGALLOPING DEVICE

RELATED APPLICATIONS

This application is a divisional of U.S. application Ser. No. 15/545,228, filed Jul. 20, 2017, which is the U.S. National Stage of International Application No. PCT/US2017/019863, filed on Feb. 28, 2017, which designates the United States. The entire teachings of the above applications are incorporated herein by reference.

BACKGROUND

Prior twisting or twister antigalloping devices have been used on spans of large diameter electrical conductor cables having an outer diameter of the complete cable 1 inch or more in diameter. Twisting the cable is an industry recognized method to control galloping, a phenomenon caused by icing and wind. When the wind catches the aerodynamic shape of an iced cable, a vertical lift is generated and results in galloping. When installed properly, the weight of the twister antigalloping device applies a torsional twist angle to the cable, preferably between 60° to 120° to vertical or 2 to 4 o'clock. As ice accumulates and forms an airfoil on the cable, the upward force of the wind causes the cable to start untwisting and lift. This untwisting action rotates the airfoil and conductor out of aerodynamic lift position, preventing further lift. Gravity forces and weight then counteracts this lift, returning twist into the cable and dropping the cable back down, thereby reducing or preventing galloping.

Twisting antigalloping devices generally have not been suitable for small diameter electrical conductor cables where the outer diameter is less than 1 inch. Such small diameter cables are more flexible than large diameter cables, and do have not the torsional stiffness to hold prior art eccentric weight devices at the required twist angle. Variations in cable span lengths and outer diameters result in a wide range of dimensionally sensitive torsional characteristics. The span length directly impacts the torsional stiffness of the cable and the weight required to twist the cable in that span. A section of adjacent spans can have variations in span lengths where one span is 250 feet, the next span is 500 feet, and a third span is 300 feet. As a result, application to a section of adjacent spans could require several devices of different weights for proper operation, making it difficult to have a standard sized twisting antigalloping device that can be used for different spans lengths of small diameter cables. For example, too little weight will not twist the cable enough, and too much weight will twist the cable too much to be in the 60° to 120° range for proper rotation of the cable during galloping.

SUMMARY OF THE INVENTION

The present invention can provide a twisting or twister antigalloping device that can be effectively used to reduce, interrupt or prevent galloping motion on a wide range of span lengths and diameters for small diameter cables. The twisting antigalloping device can secure to a span of a cable for torsionally twisting the cable and includes a grip or clamp portion having a grip or clamp axis for gripping or clamping to the cable along the clamp axis. A variable weight portion can be connected to the clamp portion and extend along a variable weight axis offset from the clamp axis. The variable weight portion can include an elongate member with a plurality of individual weights secured on the elongate member. The number of individual weights in the variable weight portion can be a whole number chosen to approximate a calculated value for the number of individual weights $N_c$ given by the equation:

$$N_c = \text{Function}(K, \Theta, W_{ND}, W_{SW})$$

where K is an estimated mid-span stiffness of the span of the cable, $\Theta$ is a desired torsional twist angle to be applied to the cable, $W_{ND}$ is a nominal weight of the antigalloping device without the individual weights of the variable weight portion, and $W_{SW}$ is a weight of a single individual weight, the chosen number of individual weights for providing the antigalloping device with a total weight $W_T$ for applying the desired torsional twist angle $\Theta$ on the cable.

In particular embodiments, the calculated value for the number of individual weights $N_C$ in the variable weight portion can be given by the equation:

$$N_C = \frac{(K\Theta - W_{ND})}{W_{SW}}.$$

The term K can be defined by the equation:

$$K = \frac{JG}{\text{Span}}(OD)^{3.3}$$

where JG is a mid-span torsional stiffness coefficient of the span of the cable, Span is a length of the span, and OD is an outer diameter of the cable. The calculated value for the number of individual weights $N_C$ in the variable weight portion can also be given by the equation:

$$N_C = \frac{\frac{JG}{\text{Span}}(OD)^{3.3} \times 12 \times \Theta - W_{ND}}{W_{SW}}$$

where JG is 555, Span is in feet, OD is in inches, $\Theta$ is in radians, $W_{ND}$ is in pounds, and $W_{SW}$ is in pounds. The clamp portion can include two clamp halves. Each clamp half can have a hub. The two clamp halves can be pivotably connected together by the elongate member of the variable weight portion extending through the hubs of the two clamp halves along the variable weight axis. The clamp axis and the variable weight axis can be parallel to each other. The individual weights can be annular weights secured at least one of between the hubs and outside of the hubs by the elongate member. The elongate member can be a first bolt, and the annular weights can be flat washers. A second bolt can extend through the two clamp halves for tightening the two clamp halves together. The number of washers in the variable weight portion can range from 8 to 40 washers. The span can be 750 feet or less, the OD<1 inch and $\Theta$ can be JI/2 radians. The antigalloping device can be clamped to an electrical conductor cable forming an antigalloping conductor span.

The present invention can also provide an antigalloping span including a cable extending in a span having a unique mid-span stiffness. A twisting antigalloping device can torsionally twist the cable and can include a grip or clamp portion having a grip or clamp axis. The clamp portion can be attached or clamped to the cable along the clamp axis. A variable weight portion can be connected to the clamp portion and extend along a variable weight axis offset from the clamp axis. The variable weight portion can include an elongate member with a plurality of individual weights secured on the elongate member. The number of individual weights in the variable weight portion can be a whole number chosen to approximate a calculated value for the number of individual weights Nc given by the equation:

$$N_C = \text{Function}(K, \Theta, W_{ND}, W_{SW})$$

where K is an estimated mid-span stiffness of the span of the cable, $\Theta$ is a desired torsional twist angle to be applied to the cable, $W_{ND}$ is a nominal weight of the antigalloping device without the individual weights of the variable weight portion, and $W_{SW}$ is a weight of a single individual weight. The chosen number of individual weights provide the antigalloping device with a total weight $W_T$ that applies the desired torsional twist angle $\Theta$ on the cable.

In particular embodiments, the calculated value for the number of individual weights $N_C$ in the variable weight portion is given by the equation:

$$N_C = \frac{(K\Theta - W_{ND})}{W_{SW}}.$$

The term K can be defined by the equation:

$$K = \frac{JG}{\text{Span}}(OD)^{3.3}$$

where JG is a mid-span torsional stiffness coefficient of the span of the cable, Span is a length of the span, and OD is an outer diameter of the cable. The calculated value for the number of individual weights Nc in the variable weight portion can also be given by the equation:

$$N_C = \frac{\frac{JG}{\text{Span}}(OD)^{3.3} \times 12 \times \Theta - W_{ND}}{W_{SW}}$$

where JG is 555, Span is in feet, OD is in inches, $\Theta$ is in radians, $W_{ND}$ is in pounds, and $W_{SW}$ is in pounds. The clamp portion can include two clamp halves, each clamp half having a hub. The two clamp halves can be pivotably connected together by the elongate member of the variable weight portion extending through the hubs of the two clamp halves along the variable weight axis. The clamp axis and the variable weight axis can be parallel to each other. The individual weights can be annular weights secured at least one of between the hubs and outside of the hubs by the elongate member. The elongate member can be a first bolt and the annular weights can be flat washers. A second bolt can extend through the two clamp halves for tightening the two clamp halves together. The number of washers in the variable weight portion can range from 8 to 40 washers. The span can be 750 feet or less, the OD<1 inch and $\Theta$ can be $\Pi/2$ radians. The span can range from 200 to 700 feet in some embodiments. The antigalloping device can be a first antigalloping device secured to the cable at a ⅓ span distance, and the span can further include a second antigalloping device secured to the cable at a ⅔ span distance.

The present invention can also provide a method of forming a twisting antigalloping device for securing to a span of a cable for torsionally twisting the cable. A grip or clamp portion of the antigalloping device can be assembled with a variable weight portion. The clamp portion can have a grip or clamp axis for attaching or clamping to the cable along the clamp axis. The variable weight portion can be connected to the clamp portion and extend along a variable weight axis offset from the clamp axis. The variable weight portion can include an elongate member with a plurality of individual weights securable on the elongate member. The number of individual weights in the variable weight portion can be chosen to be a whole number approximating a calculated value for the number of individual weights Nc given by the equation:

$$N_C = \text{Function}(K, \Theta, W_{ND}, W_{SW})$$

where K is an estimated mid-span stiffness of the span of the cable, $\Theta$ is a desired torsional twist angle to be applied to the cable, $W_{ND}$ is a nominal weight of the antigalloping device without the individual weights of the variable weight portion, and Wsw is a weight of a single individual weight. The chosen number of individual weights can provide the antigalloping device with a total weight $W_T$ for applying the desired torsional twist angle $\Theta$ on the cable.

In particular embodiments, the value for the number of individual weights $N_C$ in the variable weight portion can be calculated with the equation:

$$N_C = \frac{(K\Theta - W_{ND})}{W_{SW}}.$$

The term K can be defined with the equation:

$$K = \frac{JG}{\text{Span}}(OD)^{3.3}$$

where JG is a mid-span torsional stiffness coefficient of the span of the cable, Span is the length of the span, and OD is an outer diameter of the cable. The value for the number of individual weights $N_C$ in the variable weight portion can also be calculated with the equation:

$$N_C = \frac{\frac{JG}{\text{Span}}(OD)^{3.3} \times 12 \times \Theta - W_{ND}}{W_{SW}}$$

where JG is 555, Span is in feet, OD is in inches, $\Theta$ is in radians, $W_{ND}$ is in pounds, and $W_{SW}$ is in pounds. The clamp portion can include two clamp halves, each clamp half having a hub. The two clamp halves can be pivotably connected together with the elongate member of the variable weight portion extending through the hubs of the two clamp halves along the variable weight axis. The clamp axis and the variable weight axis can be parallel to each other. The individual weights can be annular weights securable at least one of between the hubs and outside of the hubs by the elongate member. A first bolt can be assembled as the elongate member, and flat washers can be the annular weights. A second bolt can be extended through the two clamp halves for tightening the two clamp halves together. A range of 8 to 40 washers can be assembled in the variable weight portion. The span can be 750 feet or less, the OD<1 inch, and $\Theta$ can be JI/2 radians.

The present invention can also provide a method of reducing galloping of a cable extending in a span including torsionally twisting the cable with a twisting antigalloping device comprising a grip or clamp portion having a grip or clamp axis. The clamp portion can be secured or clamped to the cable along the clamp axis. A variable weight portion can be connected to the clamp portion and extend along a variable weight axis offset from the clamp axis. The variable weight portion can include an elongate member with a plurality of individual weights securable on the elongate member. The number of individual weights in the variable weight portion can be chosen to be a whole number approximating a calculated value for the number of individual weights $N_C$ given by the equation:

$$N_C = \text{Function } (K, \Theta, W_{ND}, W_{SW})$$

where K is an estimated mid-span stiffness of the span of the cable, $\Theta$ is a desired torsional twist angle to be applied to the cable, $W_{ND}$ is a nominal weight of the antigalloping device without the individual weights of the variable weight portion, and $W_{SW}$ is a weight of a single individual weight. The chosen number of individual weights can provide the antigalloping device with a total weight $W_T$ that applies the desired torsional twist angle $\Theta$ on the cable.

In particular embodiments, the value for the number of individual weights $N_C$ in the variable weight portion can be calculated with the equation:

$$N_C = \frac{(K\Theta - W_{ND})}{W_{SW}}.$$

The term K can be defined with the equation:

$$K = \frac{JG}{\text{Span}}(OD)^{3.3}$$

where JG is a mid-span torsional stiffness coefficient of the span of the cable, Span is a length of the span, and OD is an outer diameter of the cable. The value for the number of individual weights $N_C$ in the variable weight portion can also be calculated with the equation:

$$N_C = \frac{\frac{JG}{\text{Span}}(OD)^{3.3} \times 12 \times \Theta - W_{ND}}{W_{SW}}.$$

where JG is 555, Span is in feet, OD is in inches, $\Theta$ is in radians, $W_{ND}$ is in pounds, and $W_{SW}$ in pounds. The clamp portion can include two clamp halves each clamp half having a hub. The two clamp halves can be pivotably connected together with the elongate member of the variable weight portion extending through the hubs of the two clamp halves along the variable weight axis. The clamp axis and the variable weight axis can be parallel to each other. The individual weights can be annular weights securable at least one of between the hubs and outside of the hubs by the elongate member. A first bolt can be assembled as the elongate member and flat washers as the annular weights. A second bolt can extend through the two clamp halves for tightening the two clamp halves together. A range of 8 to 40 washers can be assembled in the variable weight portion. The span can be 750 feet or less, the OD<1 inch, and $\Theta$ can be $\Pi/2$ radians. In some embodiments, the span can range from 200 to 700 feet. The antigalloping device can be a first antigalloping device secured to the cable at a ⅓ span distance, and span can further include a second antigalloping device secured to the cable at a ⅔ span distance.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
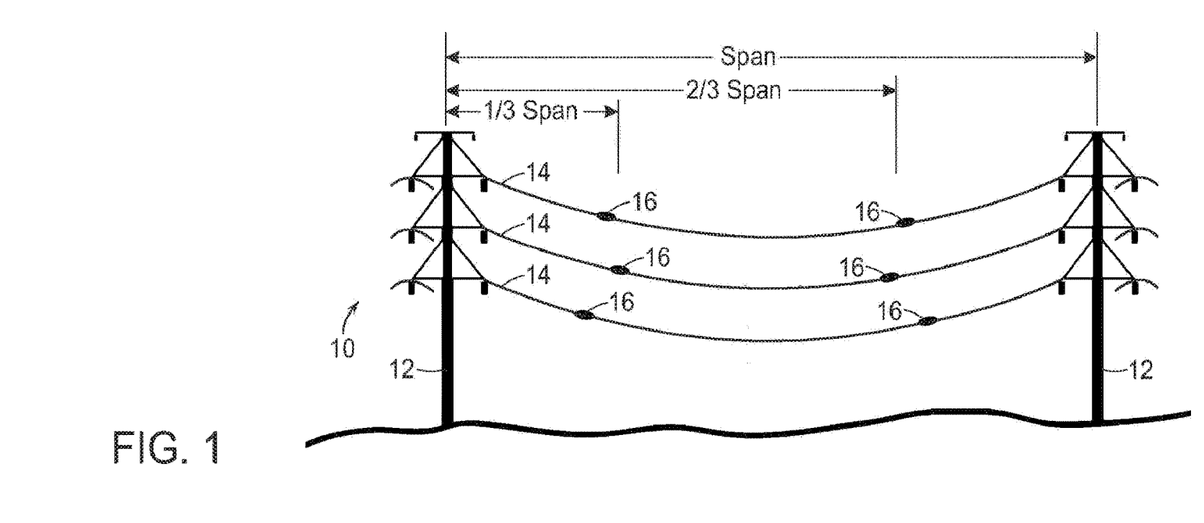
FIG. 1 is a schematic drawing of an embodiment of an antigalloping electrical conductor cable span in the present invention.

FIG. 1 depicts an embodiment of an antigalloping electrical conductor cable span 10 in the present invention. Antigalloping refers to interrupted, reduced or little galloping where motion is minimal and within a safe range, thereby preventing harmful galloping motion. The span 10 can include one or more electrical conductor lines, wires or cables 14 extending between and supported by towers or poles 12. Each cable 14 can include at least one small or lightweight offset weight twister or twisting antigalloping device 16 secured to the cable 14, the weight of the device 16 providing a predetermined or pre-loaded torsional twist to the cable about 90° from vertical. In the example shown, there can be top, middle and bottom cables 14 on each side of the towers 12. One device 16 can twist cable 14 at the ⅓ span location, and another device 16 can twist cable 14 at the ⅔ span location. The twisting antigalloping device 16 is preferably for use with small diameter electrical conductor cables, where the outer diameter OD is less than 1 inch (OD<1 inch), and where the length of the span is 750 feet or less, or less than 750 feet, such as ranging from 200 to 700 feet.

Figure 2:
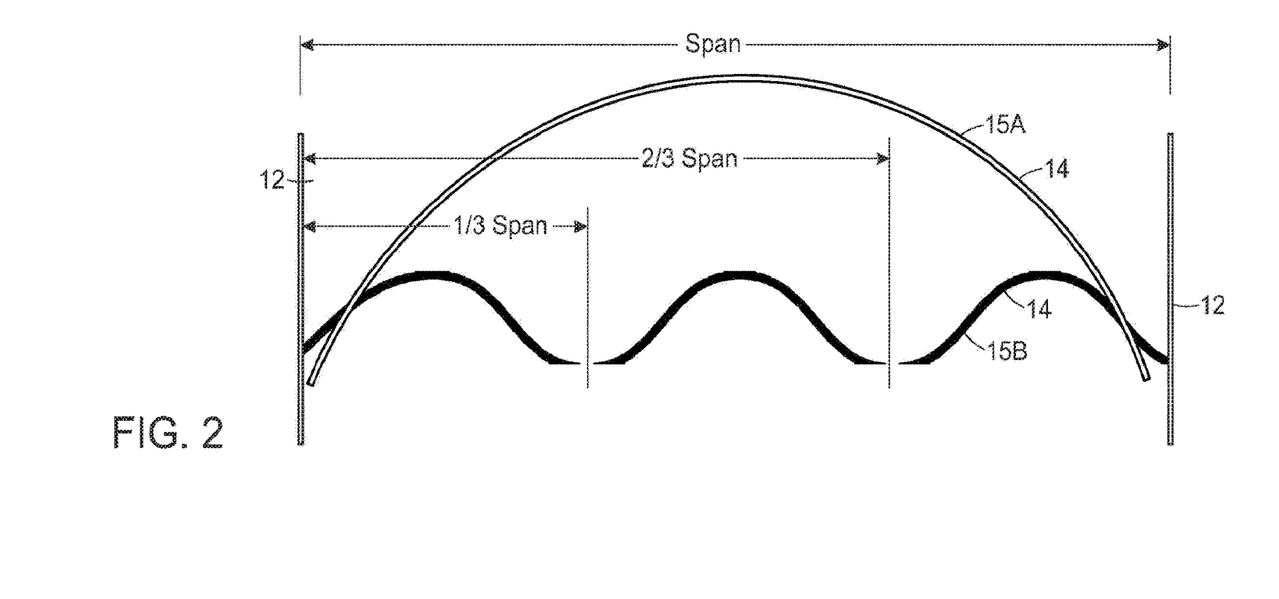
FIG. 2 is a schematic drawing of superimposed images of a galloping cable span and a cable span having reduced galloping due to the present invention twisting antigalloping device.

Referring to FIG. 2, if a cable 14 does not have antigalloping protection, the cable 14 can experience high or large amplitude galloping in which icing and wind over the span causes lift as indicated by reference numeral 15A. Such large amplitude galloping can be a single loop gallop as shown, or can be a double loop gallop, and can cause damage to the cable 14 and towers 12. In contrast, placement of twisting antigalloping devices 16 at the ⅓ span and the ⅔ span locations of the cable 14 can transform what would be a single or double loop gallop into a harmless three loop sine wave with a small amplitude, as indicated by reference numeral 15B, thereby preventing damage to the cable 14 and towers 12. As the cable 14 lifts due to icing and wind, the preloaded torsional twist of the cable 14 at the ⅓ span and ⅔ span locations untwists, rotating any lift generating ice formations out of lift orientation, so that there is typically little or no lift at the ⅓ span and ⅔ span locations, thereby reducing or damping galloping or vibration of the cable 14 and span 10.

Referring to FIGS. 3-7, one embodiment of the antigalloping device 16 can include a grip or clamp, or grip or clamp portion 20 having two clamp or grip halves 20a and 20b. Each clamp half 20a and 20b can include a respective inner opposed curved jaw 22a and 22b, and a mid-body portion 24a and 24b integrally extending from or connected to a jaw 22a and 22b. A hub or hub portion 26a and 26b can integrally extend from or connect to a respective mid-body portion 24a and 24b offset to one side. The clamp halves 20a and 20b are pivotably or rotatably connected together through holes 38 in the hubs 26a and 26b by an elongate member 32 of a variable weight portion 35 extending therethrough along a variable weight axis B. The elongate member 32 can be a first bolt that is secured with a nut 32a such as a lock nut. A second bolt 30 can extend through the two clamp halves 20a and 20b through holes 36 in mid-body portions 24a and 24b along a clamp tightening axis C that is orthogonal to variable weight axis B. The second bolt 30 can be secured to a lock washer 30a and locknut 30b for tightening the jaws 22a and 22b of clamp 20 about a cable 14 along a grip or clamp axis A, for securing, attaching gripping or clamping thereto. The holes 36 can have a counterbore 36a on the inner side which can provide pivoting clearance. The clamp axis A of the jaws 22a and 22b can be offset from and parallel to the variable weight axis B, and orthogonal to the clamp tightening axis C. Clamp half 20a can have two parallel ridges or keeper structures 28 on the outer surface of the mid-body portion 24a for rotationally trapping the head of bolt 30 to allow for easy installation and tightening of nut 30b. The mid-body portion 24b of clamp half 20b can have a smooth outer surface (FIG. 5) to allow rotation of nut 30b during tightening.

Figure 5:
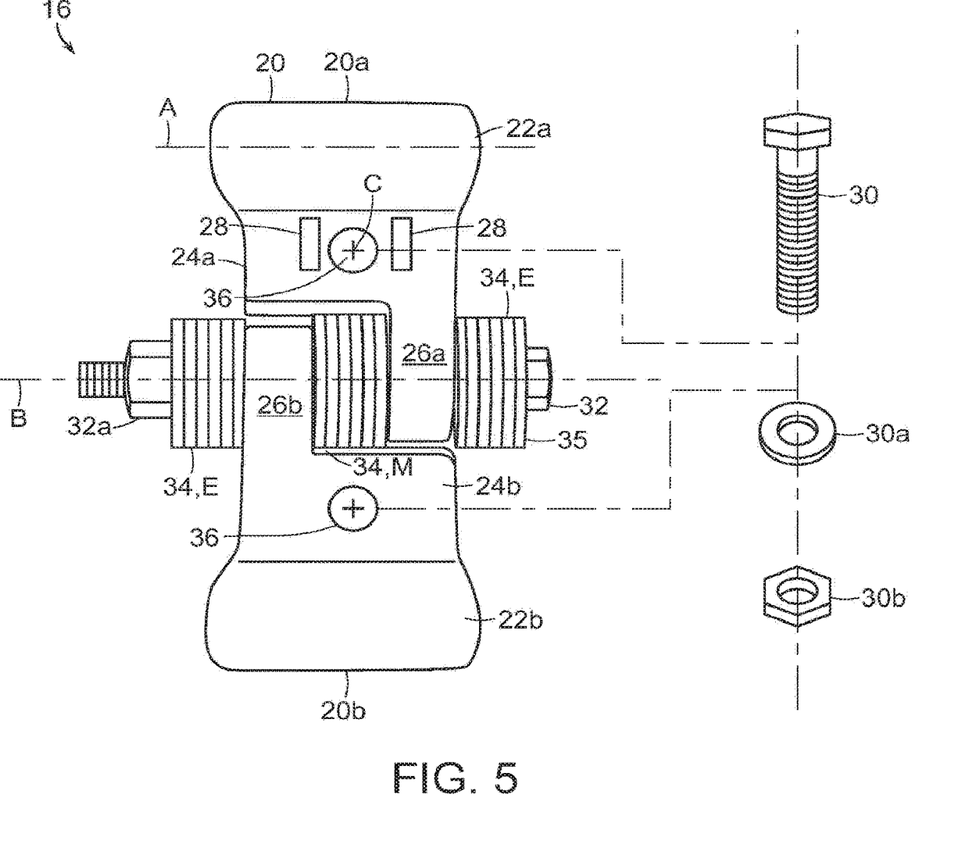
FIG. 5 is a plan view of an unfolded twisting antigalloping device with some components in an exploded view.
Figure 6:
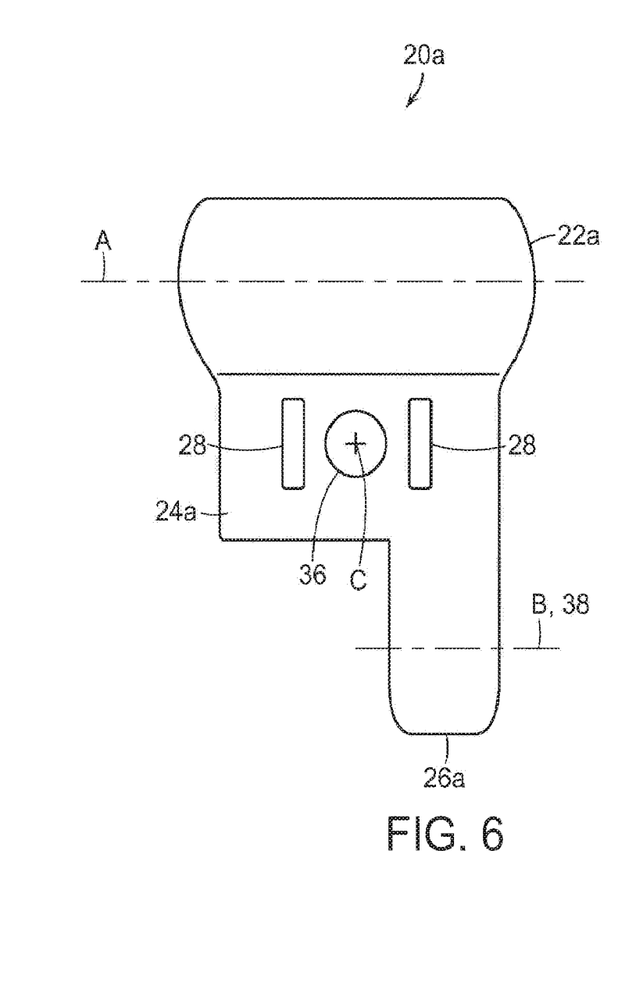
FIG. 6 is a plan view of an embodiment of one clamp half in the present invention.
Figure 7:
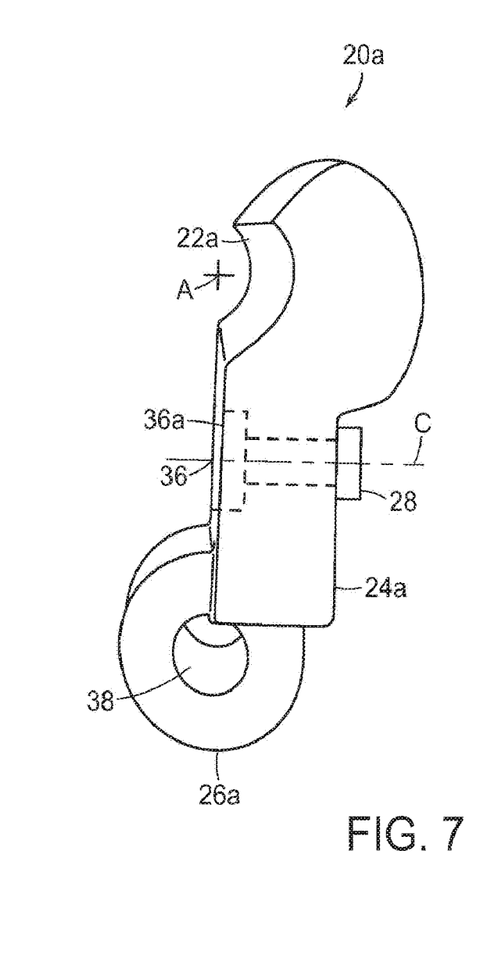
FIG. 7 is an edge view of the clamp half of FIG. 6.
Figure 8:
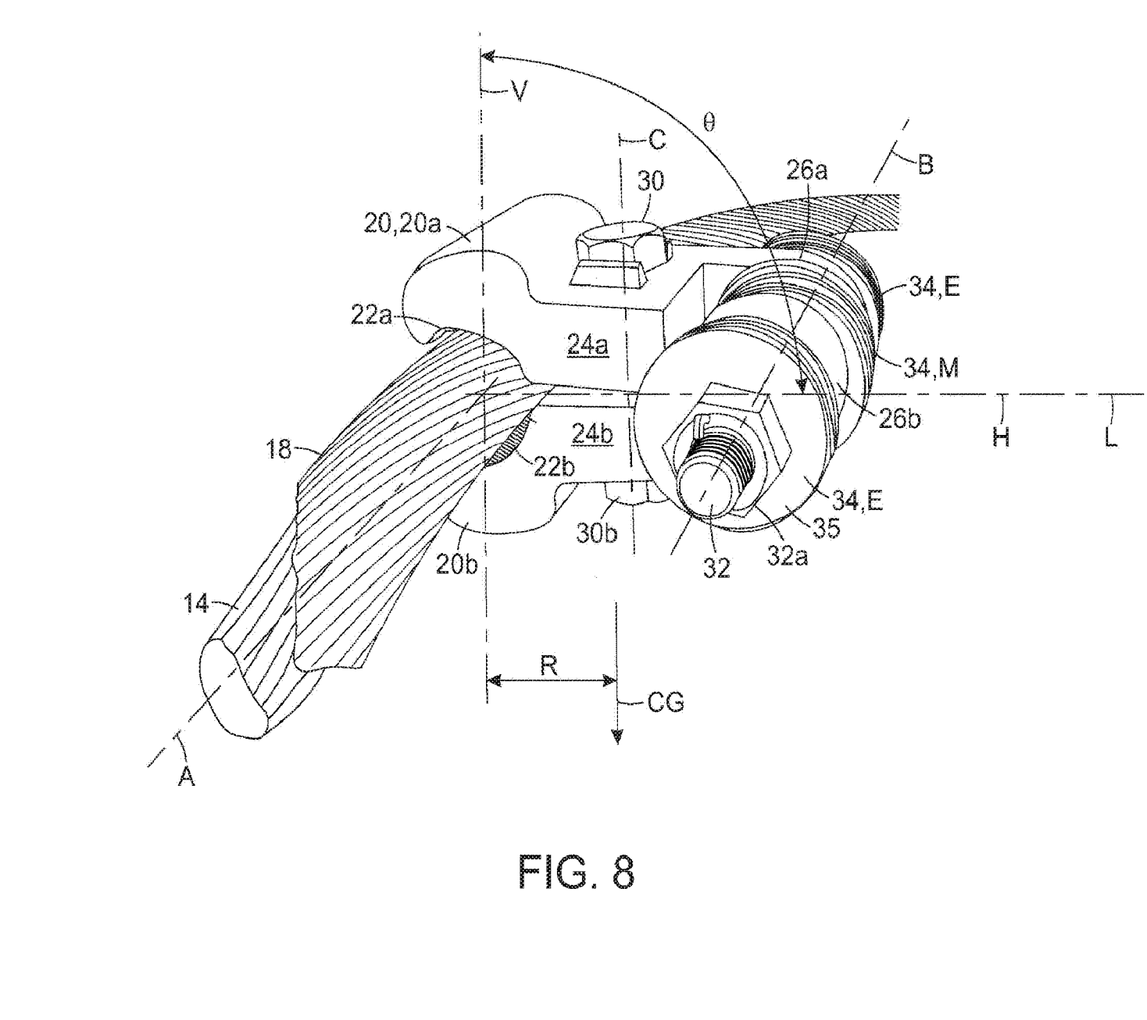
FIG. 8 is a perspective view of a twisting antigalloping device secured to an electrical conductor cable and torsionally twisting the cable 90° from vertical to be oriented in a horizontal position.

In one embodiment, the clamp 20 can be about 5 inches from the front of jaws 22a and 22b to the rear of hubs 26a and 26b. The jaws 22a and 22b can have an axial width along axis A of about 3½ inches, the mid-body portions 24a and 24b can be about 2¾ inches wide and about ¾ inches thick. The clamp axis A can be parallel and offset from the variable weight axis B by about 3¼ inches, and the clamp tightening axis C can be orthogonal and offset from axis B by about 2 inches. The center of gravity CG can be offset from the clamp axis A by an average of about 1 inch (FIG. 8), or can be chosen to be 1 inch for providing estimated calculations. The hubs 26a and 26b can have a width along axis B of about ⅞ inches and can have an axial gap between hubs 26a and 26b of about 1 inch. The clamp halves 20a and 20b can be formed or cast from aluminum. Bolts 30 and 32 can have a ⅝ inch diameter.

The variable weight portion 35 can include the elongate member or first bolt 32 and nut 32a, and a plurality or number of individual weights of equal size and weight which can have mounting holes therethrough, or be annular weights such as flat washers 34 that can be slidably added or subtracted from the bolt 32. The bolt 32 can be ⅝ inch in diameter and the flat washers 34 can have about 0.8 inch inner diameter, 2 inch outer diameter, and ⅛ inch thickness. The variable weight portion 35 can have about 8 to 40 washers 34, with 6 washers 34 being positioned in the middle M between the hubs 26a and 26b, and the remainder of the washers 34 can be positioned on the ends E outside or beyond the hubs 26a and 26b, on the bolt along axis B through the inner diameter holes of the washers 34. In some embodiments, the washers 34 can each weigh 1.7 oz (0.1 lbs), where 8 washers 34 can weigh about 0.8 lbs, and 40 washers 34 can weigh about 4 lbs. As a result, in some embodiments, the weight provided by the washers 34 in variable weight portion 35 can range from about 0.8 to 4 lbs. In some embodiments, the twisting antigalloping device 16 can have a total weight $W_T$ ranging from about 3.3 lbs to 6.5 lbs. In one embodiment, the washers 34 on the ends E are added or subtracted in symmetrical pairs or 3.4 oz increments, but in other embodiments the placement does not have to be symmetrical and can be in 1.7 oz increments.

The purpose of the variable weight portion 35 is to customize the twisting antigalloping device 16 to have the proper total weight $W_T$ for applying a predetermined or preloaded 90° torsional twist to particular electrical conductor cables 14 despite having varying outer diameters OD where OD<1 inch in varying span lengths that are 750 feet or less. Such small outer diameters in such span lengths are relatively very flexible in comparison to large diameter cables, and variations in outer diameter and/or length of the span 10 can result in a large range of torsional flexibility or stiffness variations that can require sensitive weight changes within a very narrow range in order for the twisting antigalloping device 16 to apply a preloaded 90° twist angle Θ at equilibrium, to a particular small diameter cable 14.

Figure 3:
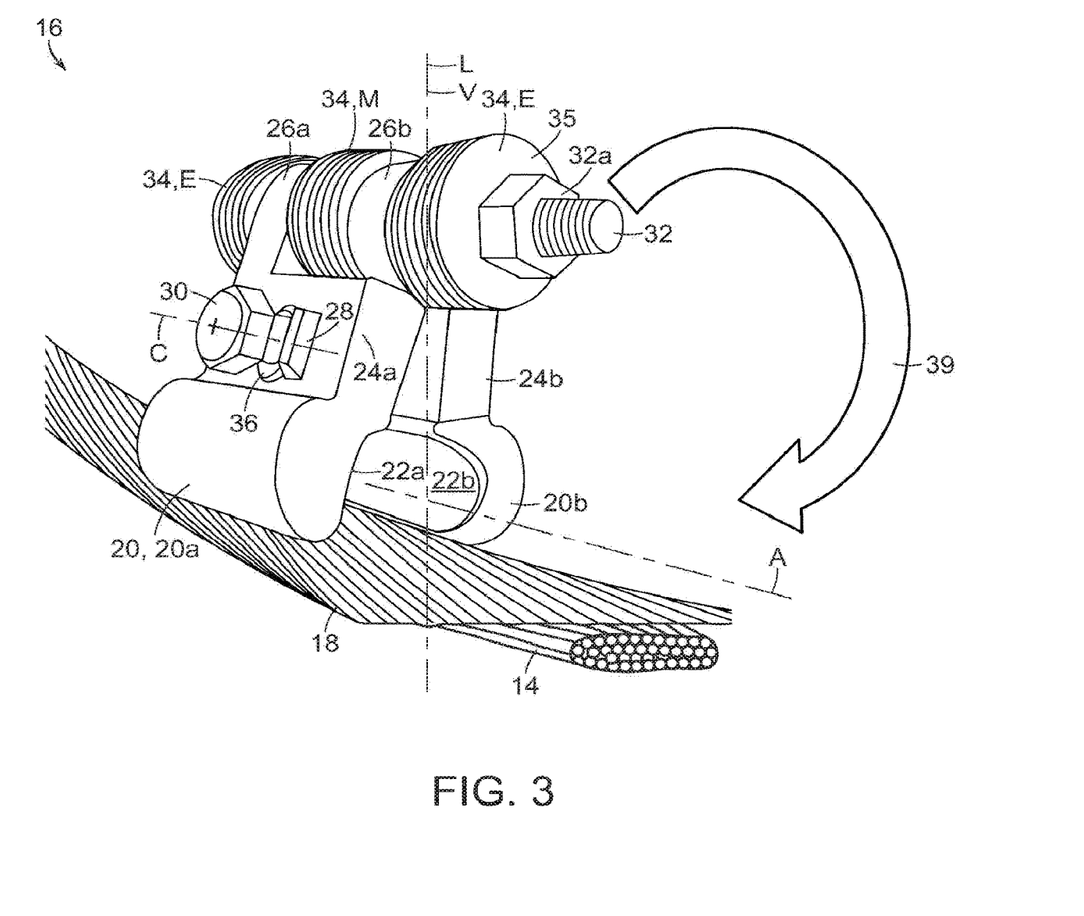
FIG. 3 is a perspective view of an embodiment of a twisting antigalloping device in the present invention being installed on an electrical conductor cable.
Figure 4:
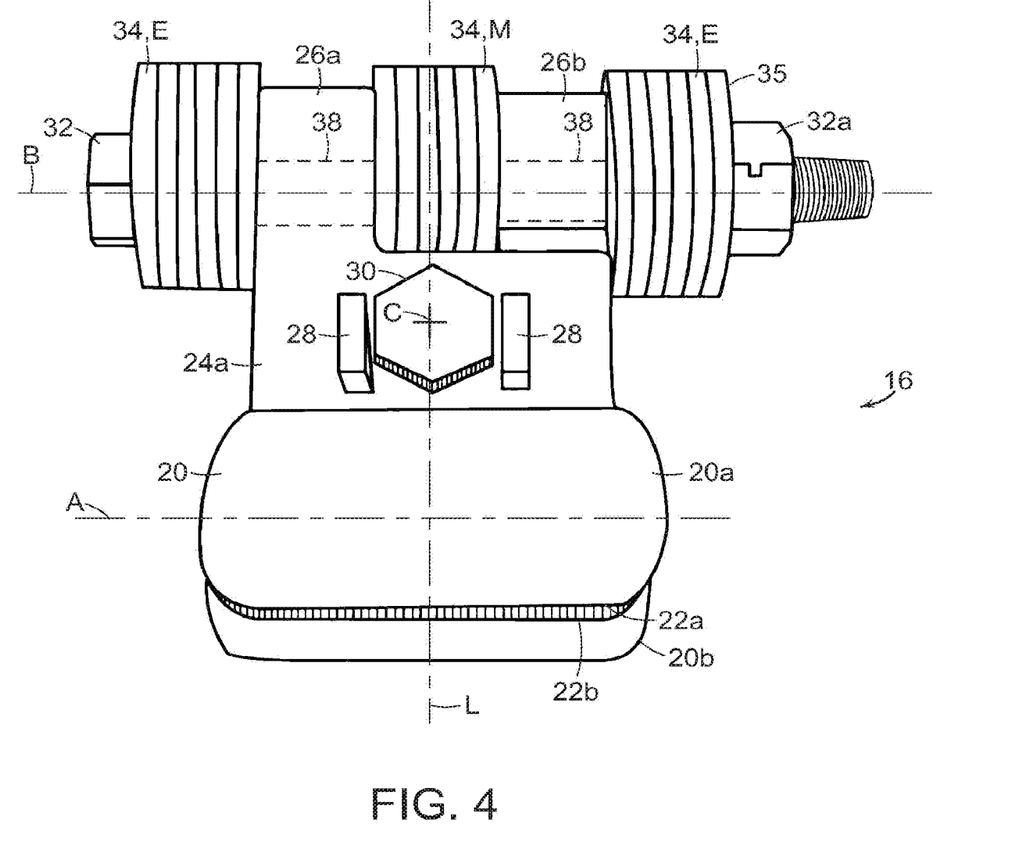
FIG. 4 is a plan view of an embodiment of a twisting antigalloping device in the present invention.
Figure 9:
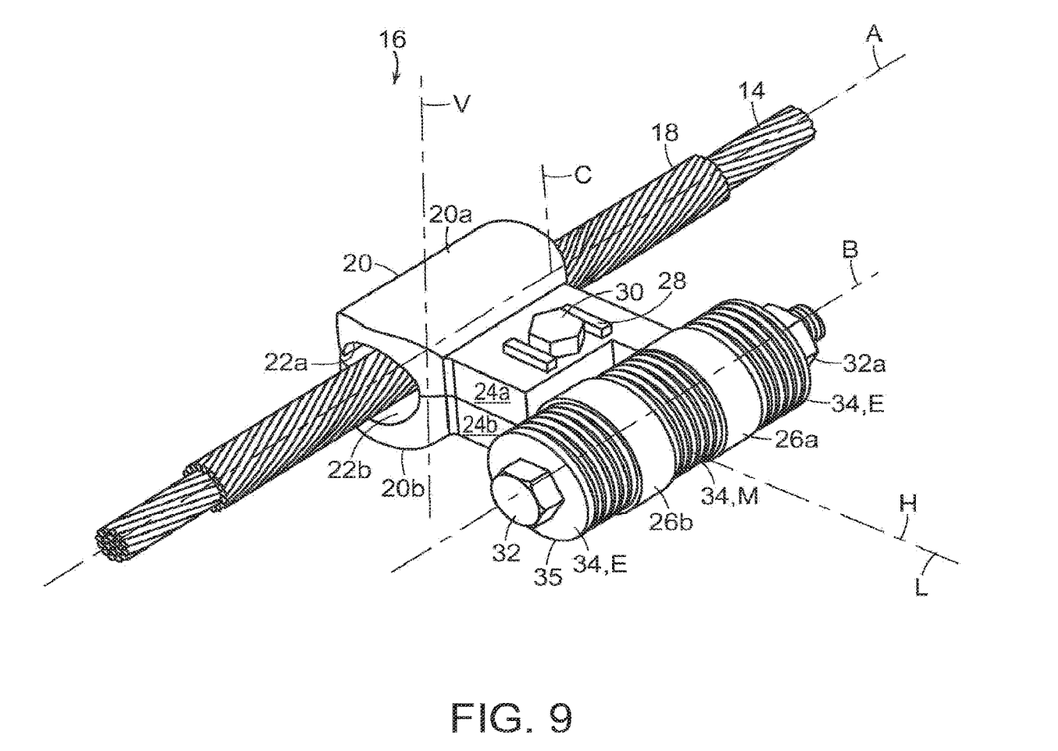
FIG. 9 is a perspective view of a twisting antigalloping device secured to a portion of an electrical conductor cable covered by a length of armor rod and twisted 90° to vertical.
Figure 10:
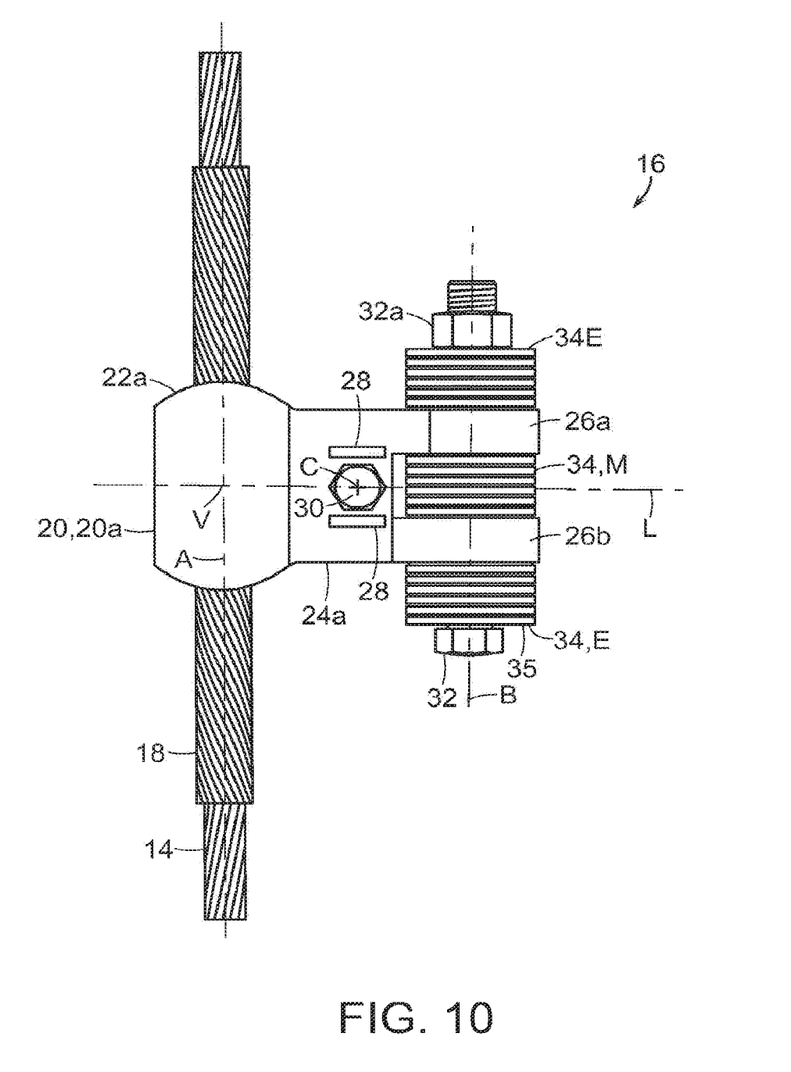
FIG. 10 is a top view of the twisting antigalloping device and cable shown in FIG. 9.

Referring to FIG. 3, a twisting antigalloping device 16 of predetermined proper weight for a particular cable 14, outer diameter OD and span length, can be installed on-site by first placing a length of a protective lineguard, armor rod or sheath 18 over the cable 14, such as about 30 inches long. The antigalloping device 16 is then oriented with its longitudinal axis L upright along or close to the vertical axis V with the jaws 22a and 22b spread apart and facing downwardly, and the variable weight portion 35 being on top or facing upwardly. The jaws 22a and 22b are tightened over the armor rod 18 and cable 14 with the variable weight portion 35 in the upward position by tightening the nut 30b onto bolt 30 along clamp tightening axis C. The offset weight or center of gravity CG (FIG. 8) of antigalloping device 16 causes the antigalloping device 16 to fall, pivot or rotate about clamp axis A in the direction of arrow 39 until reaching a rotational equilibrium point to apply a preloaded torsional twist to the cable 14, of an angle Θ, such as 90° or 3 o'clock (FIGS. 8-10) relative to the vertical axis V. The torsional stiffness of the cable 14 can resist further twisting beyond the equilibrium point. The antigalloping device 16 at the preloaded rotational equilibrium point can have the longitudinal axis L oriented along the horizontal axis H. The 90°, 3 o'clock, or horizontal equilibrium orientation or position is typically preferred, but equilibrium positions ranging from 60° to 120° relative to vertical axis V (2-4 o'clock or 8-10 o'clock) on either right or left sides of axis V is considered within suitable range in the present invention. Once the antigalloping device 16 is in the equilibrium position, the device is ready to reduce or dampen galloping due to icing and wind.

Figure 11:
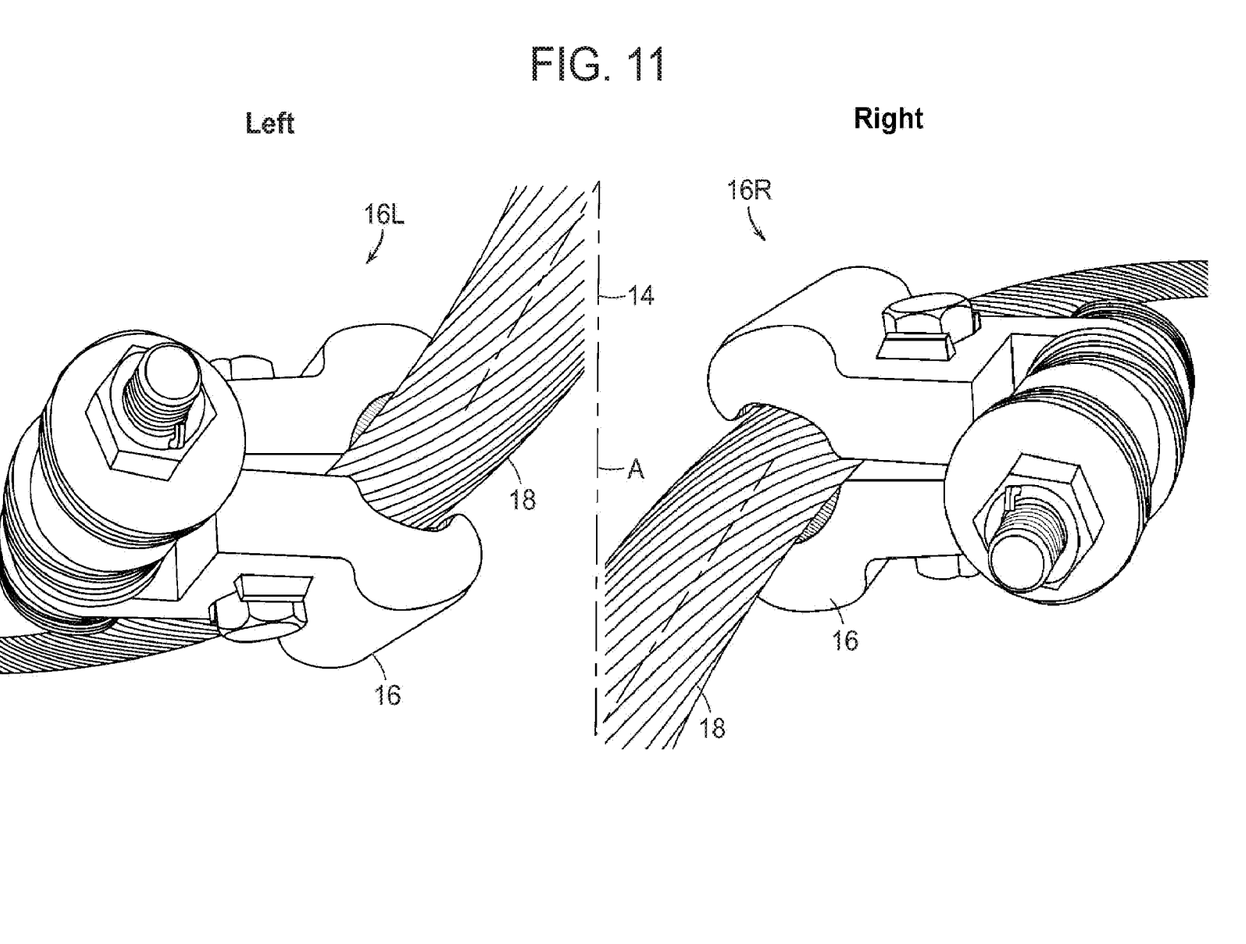
FIG. 11 is a perspective view of a pair of twisting antigalloping devices secured to an electrical conductor cable, one twisted 90° to the left and the other twisted 90° to right.

FIG. 11 depicts antigalloping devices 16 being in left 16L and right 16R equilibrium positions on a cable 14. In some embodiments, antigalloping devices 16 can be only in the left 16L position or only in the right 16R position. In some embodiments, left 16L and right 16R positions can be on the same cable 14 of a span 10 in a counterbalanced pair, such as when a cable 14 is too torsionally flexible or not stiff enough to hold a set equilibrium position of 90° to the vertical axis V. This can be when the length of a span 10 is too long relative to the outer diameter. One of the pairs can be at the ⅓ span location and the other at the ⅔ span location.

Referring back to FIGS. 3-10, for cables 14 having an OD<1 inch, and a span of 750 feet or less, the antigalloping devices 16 require narrow total weight $W_T$ ranges for twisting cable 14 to the 90° to vertical axis V equilibrium position. The required total weight $W_T$ varies depending on the outer diameter OD of the cable 14 and the length of the span 10. Too little weight $W_T$ will not twist the cable 14 enough, and too much weight $W_T$ will twist the cable 14 too much to be in the suitable 60° to 120° range for proper rotational operation. As a result, the present invention includes a variable weight portion 35 in which the chosen or actual number $N_A$ of individual or annular weights or washers 34 included in the variable weight portion 35 can be predetermined or pre-chosen for a particular installation to approximate a precalculated value for the number of annular weights $N_C$, based on the design and dimensions of the antigalloping device 16, the outer diameter OD of the cable 14 and the length of the span 10 at the installation. The pre-chosen or actual number $N_A$ of annular weights 34 can be to the nearest whole number, or to the nearest even whole number in order to have a symmetrical number of annular weights 34 on the ends E of the variable weight portion 35. As a result, the antigalloping devices 16 can be premade at the proper weight for a particular installation without requiring the weight of the variable weight portion 35 to be changed when installed by trial and error. This can be desirable since the cables 14 in an electrical conductor span 10 are located high above the ground.

Figure 12:
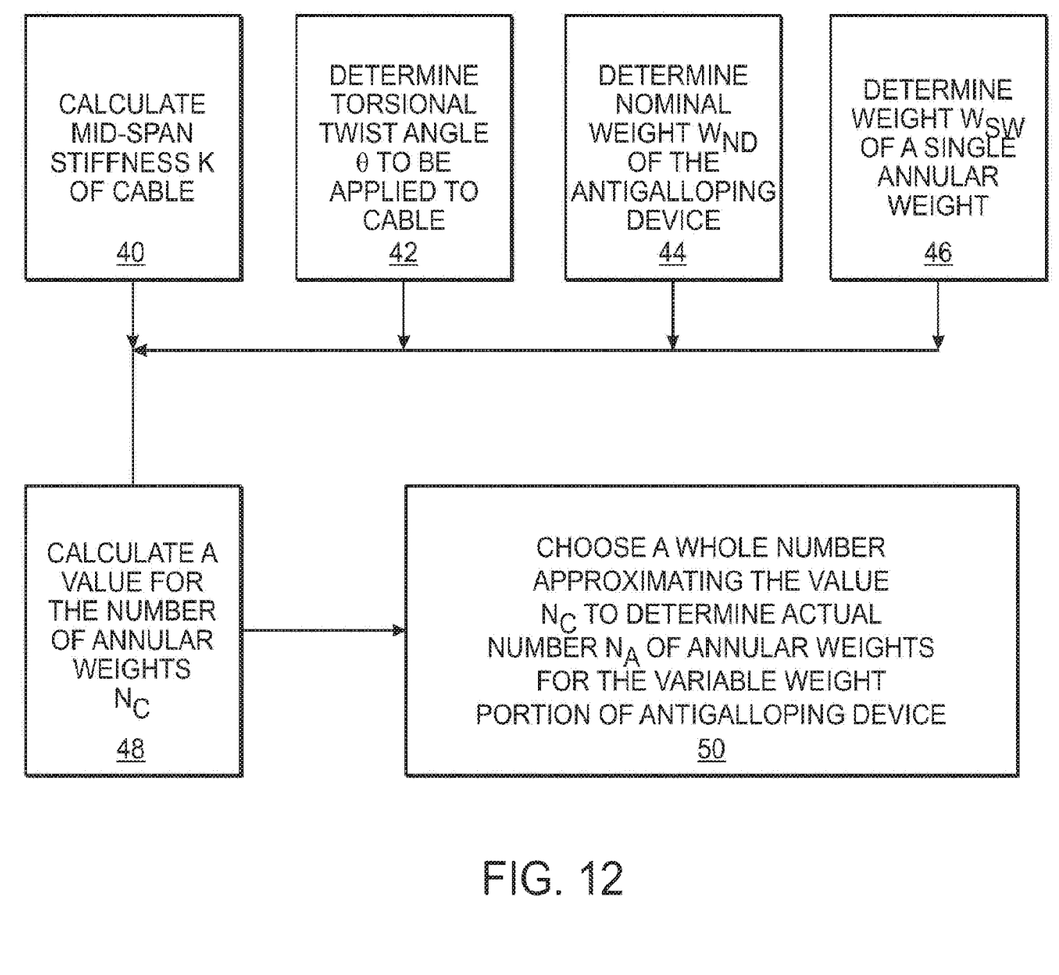
FIG. 12 is a flowchart of steps for determining the number of annular weights to be included in the variable weight portion of embodiments of the twisting antigalloping device in the present invention.

Referring to FIG. 12, in order to determine the actual number $N_A$ of annular weights 34 for the variable weight portion 35, an estimated mid-span stiffness K for cable 14 is first calculated, in step 40, where K can be determined by Equation 1:

$$K = \frac{JG}{\text{Span}}(OD)^{3.3}$$

where JG is an estimated mid-span torsional stiffness coefficient of the span 10 of the cable 14. The Applicant has estimated by his experience that for a cable where OD<1 inch in a span 10 of 750 feet or less, the coefficient JG=555.

The Span in the equation is the length of the span 10 of the cable 14 in feet, and OD is the outer diameter of the cable 14 in inches. Multiplying the OD to 3.3 power, is not multiplying by a whole number, but is a number used in view of the Applicant's observations and experience, to work out in Equation 1 to provide or calculate an estimated stiffness value K. In order to convert K from ft-lbs to in-lbs, the value of K in ft-lbs can be multiplied by 12.

In step 42, the torsional equilibrium twist angle Θ to be applied to the cable 14 is determined, which is typically 90°, 3 o'clock, or Π/2 (Pi/2) radians (about 1.57 radians) to the vertical axis V. In step 44, the nominal weight $W_{ND}$ of the antigalloping device 16 without the weight of the annular weights 34 is determined. The $W_{ND}$ can differ, depending upon the clamp 20 used, but in some embodiments can be about 2½ pounds. In step 46, the weight $W_{SW}$ of a singular annular weight 34 can be determined, and in one embodiment, flat washers used as the annular weights 34 can be each 1.7 ounces or 0.1 pounds. Steps 40-46 can be performed simultaneously or serially in any order.

In step 48, a calculated value for the number of annular weights $N_C$ can be made as a Function (K, Θ, $W_{ND}$ and $W_{SW}$), given by Equation 2:

$$N_C = \frac{(K\Theta - W_{ND})}{W_{SW}}$$

where K is in in-lbs/radians, Θ is in radians, $W_{ND}$ and $W_{SW}$ are in lbs.

The term KΘ provides a torque generated by the center of gravity CG of antigalloping device 16 located at a distance R (FIG. 8) from the clamp axis A. In some embodiments, the term KΘ/R can be inserted into the above Equation 2 to replace or instead of term KΘ, however the Applicant can give the distance R a value of 1 taking into account the small size of the clamp 20 and the location of the variable weight portion 35 relative to clamp axis A, to simplify KΘ/R to KΘ in Equation 2 for use as an approximation. Having a short distance R from the center of gravity CG to the clamp axis A creates a small moment arm for twisting the cable 14.

In some embodiments, steps 40-48 can be done in one operation or one equation given by Equation 3:

$$N_C = \frac{\frac{JG}{\text{Span}}(OD)^{3.3} \times 12 \times \Theta - W_{ND}}{W_{SW}}$$

Equations 2 and 3 generally describe calculating, determining or using a mid-span stiffness K, multiplying by the twist angle Θ, and subtracting the nominal weight $W_{ND}$ of the antigalloping device 16, which gives the total collective weight of the weights or washers 34 needed, and then dividing by the weight of a single weight or washer 34 to determine the calculated number of weights or washers $N_C$. Equations 2 and 3 can be considered to be calculated or used if performed in multiple steps or over time, such as calculating different parts of the equations separately or not at the same time, rather than in one equation or operation.

Since the value calculated for $N_C$ is typically a number including a decimal, in step 50 a whole number approximating the value $N_C$ is chosen to determine the actual number $N_A$ of annular weights 34 for the variable weight portion 35 of the antigalloping device 16. In one embodiment, the whole number chosen is an even number so that the variable weight portion 35 is symmetrical. In other embodiments, odd numbers can be chosen, if desired. In some embodiments, the actual number $N_A$ can be chosen or determined using a computer program. Although a twist angle $\Theta$ of $\pi/2$ radians or 90° to the vertical axis V is used for selecting the number of annular weights 34, in one embodiment by choosing the annular weights by small increments of 3.4 ounces if in pairs, or by smaller increments of 1.7 ounces if by single weights, the present invention can have an allowable suitable twist angle $\Theta$ in the range of 60° to 120° which can compensate for differences between the weight for the calculated value Nc and the actual weight provided by the incremental chosen or actual number $N_A$ of annular weights 34. In addition, the small moment arm provided by the distance R to the center of gravity CG can provide less sensitivity to changes in the number of washers 34 relative to generated torque.

Figure 13:
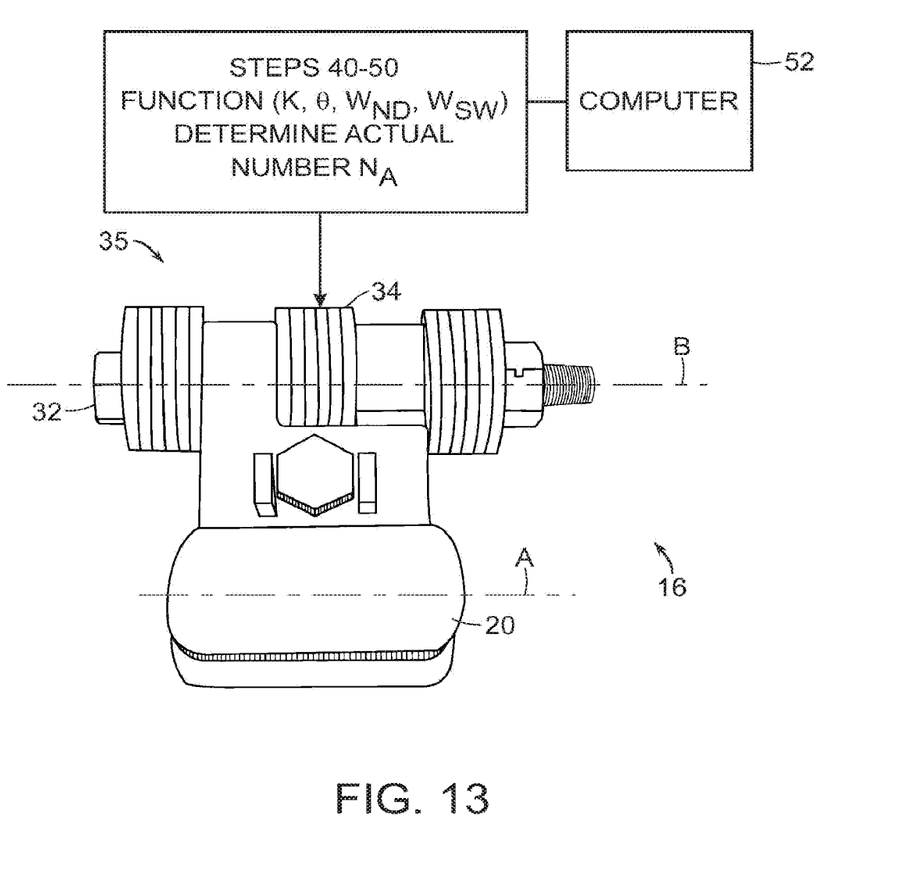
FIG. 13 is a schematic drawing of a veritable weight twisting antigalloping device as a function of K, $\Theta$, $W_{ND}$, $W_{SW}$.

Referring to FIG. 13, steps 40-50 and the associated equations can be performed in a computer program by a computer 52. The antigalloping device 16 can have a variable weight portion 35, in which the chosen or actual number $N_A$ of individual or annular weights or washers 34 approximates or is a predetermined or precalculated Function (K, $\Theta$, $W_{ND}$, $W_{SW}$) as described in steps 40-50 and associated equations. In some embodiments, choosing $N_A$ to approximate $N_C$ can be considered part of the Function (K, $\Theta$, $W_{ND}$, $W_{SW}$). As a result, the variable weight portion 35 can be considered to include the Function (K, $\Theta$, $W_{ND}$, $W_{SW}$) or steps 40-50. The estimated mid-span stiffness K is dependent upon the length of span 10 and the outer diameter of cable 14, $\Theta$ is usually chosen to be about 90° ($\pi/2$ radians), $W_{ND}$ and $W_{SW}$ can be consistent or can change depending upon the size and components chosen. In some embodiments, the weights 34 can have other suitable shapes, and other suitable clamps can be used. In some embodiments, the dimensions of the antigalloping device 16 and clamps 20 can vary depending upon the size of the cable.

While this invention has been particularly shown and described with references to example embodiments thereof, it will be understood by those skilled in the art that various changes in form and details may be made therein without departing from the scope of the invention encompassed by the appended claims. For example, the design of the antigalloping device 16 can also be used on cables having diameters large than 1 inch. In some embodiments, some of the features in the present invention can be similar to selected features disclosed in U.S. Pat. No. 4,777,327, issued Oct. 11, 1988, the contents of which are incorporated herein by reference in its entirety.

What is claimed is:

1. A method of forming a twisting antigalloping device for securing to a span of a cable for torsionally twisting the cable comprising:
assembling a clamp portion of the antigalloping device with a variable weight portion, the clamp portion having clamp axis for clamping to the cable along the clamp axis, the variable weight portion connecting to the clamp portion and extending along a variable weight axis offset from the clamp axis, the variable weight portion comprising an elongate member with a plurality of individual weights securable on the elongate member; and
choosing the number of individual weights in the variable weight portion to be a whole number approximating a calculated value for the number of individual weights Nc given by the equation:

$$N_C = \frac{K\theta - W_{ND}}{W_{SW}}$$

where K is an estimated mid-span stiffness of the span of the cable, $\theta$ is a desired torsional twist angle to be applied to the cable, $W_{ND}$ is a nominal weight of the antigalloping device without the individual weights of the variable weight portion, and $W_{SW}$ is a weight of a single individual weight, the chosen number of individual weights for providing the antigalloping device with a total weight $W_T$ for applying the desired torsional twist angle $\theta$ on the cable.

2. The method of claim 1 further comprising defining K with the equation:

$$K = \frac{JG}{\text{Span}}(OD)^{3.3}$$

Where JG is a mid-span torsional stiffness coefficient of the span of the cable, Span is a length of the span, and OD is an outer diameter of the cable.

3. The method of claim 2 further comprising calculating the value for the number of individual weights $N_C$ in the variable weight portion with the equation:

$$N_C = \frac{\frac{JG}{\text{Span}}(OD)^{3.3} \times 12 \times \Theta - W_{ND}}{W_{SW}}$$

where JG is 555, Span is in feet, OD is in inches, $\Theta$ is in radians, $W_{ND}$ is in pounds, and $W_{SW}$ is in pounds.

4. The method of claim 1 in which the clamp portion comprises two clamp halves, each clamp half having a hub, the method further comprising pivotably connecting the two clamp halves together with the elongate member of the variable weight portion extending through the hubs of the two clamp halves along the variable weight axis, the clamp axis and the variable weight axis being parallel to each other, the individual weights being annular weights securable at least one of between the hubs and outside of the hubs by the elongate member.

5. The method of claim 4 further comprising:
assembling a first bolt as the elongate member, and flat washers as the annular weights; and
extending the second bolt through the two clamp halves for tightening the two clamp halves together.

6. hod of claim 5 further comprising assembling 8 to 40 washers in the variable weight portion.

7. The method of claim 3 in which the span is 750 feet or less, OD<1 inch, and $\Theta$ is $\pi/2$ radians.

8. A method of reducing galloping of a cable extending in a span comprising:
torsionally twisting the cable with a twisting antigalloping device comprising a clamp portion having a clamp axis, the clamp portion being clamped to the cable along the clamp axis, and a variable weight portion connected to the clamp portion and extending along a variable weight axis offset from the clamp axis, the variable weight portion comprising an elongate member with a plurality of individual weights securable on the elongate member; and choosing the number of individual weights in the variable weight portion to be a whole number approximating a calculated value for the number of individual weights $N_C$ given by the equation:

$$N_C = \frac{K\theta - W_{ND}}{W_{SW}}$$

where K is an estimated mid-span stiffness of the span of the cable, Θ is a desired torsional twist angle to be applied to the cable, $W_{ND}$ is a nominal weight of the antigalloping device without the individual weights of the variable weight portion, and $W_{SW}$ is a weight of a single individual weight, the chosen number of individual weights for providing the antigalloping device with a total weight $W_T$ for applying the desired torsional twist angle Θ on the cable.

9. The method of claim 8 further comprising defining K with the equation:

$$K = \frac{JG}{\text{Span}}(OD)^{3.3}$$

Where JG is a mid-span torsional stiffness coefficient of the span of the cable, Span is a length of the span, and OD is an outer diameter of the cable.

10. The method of claim 9 further comprising calculating the value for the number of individual weights $N_C$ in the variable weight portion with the equation:

$$N_C = \frac{\frac{JG}{\text{Span}}(OD)^{3.3} \times 12 \times \Theta - W_{ND}}{W_{SW}}$$

where JG is 555, Span is in feet, OD is in inches, Θ is in radians, $W_{ND}$ is in pounds, and $W_{SW}$ is in pounds.

11. The method of claim 8 in which the clamp portion comprises two clamp halves, each clamp half having a hub, the method further comprising pivotably connecting the two clamp halves together with the elongate member of the variable weight portion extending through the hubs of the two clamp halves along the variable weight axis, the clamp axis and the variable weight axis being parallel to each other, the individual weights being annular weights securable at least one of between the hubs and outside the hubs by the elongate member.

12. The method of claim 11 further comprising:
assembling a first bolt as the elongate member and flat washers as the annular weights; and
extending a second bolt through the two clamp halves for tightening the two clamp halves together.

13. The method of claim 10 further comprising assembling 8 to 40 washers in the variable weight portion.

14. The method of claim 10 in which the span is 750 feet or less, the OD<1 inch, and Θ is Π/2 radians.

15. The method of claim 14 in which span ranges from 200 to 700 feet.

16. The method of claim 8 in which the antigalloping device is a first antigalloping device secured to the cable at a ⅓ span distance, and the span further comprising a second antigalloping device secured to the cable at a ⅔ span distance.

* * * * *

UNITED STATES PATENT AND TRADEMARK OFFICE
CERTIFICATE OF CORRECTION

| | |
|---|---|
| PATENT NO. | : 11,581,721 B2 |
| APPLICATION NO. | : 17/718727 |
| DATED | : February 14, 2023 |
| INVENTOR(S) | : Albert S. Richardson, Jr. |

It is certified that error appears in the above-identified patent and that said Letters Patent is hereby corrected as shown below:

In the Claims

In Claim 6, Column 12, Line 53, delete "hod of" and insert -- The method of --.

Signed and Sealed this
Eleventh Day of April, 2023

Katherine Kelly Vidal
Director of the United States Patent and Trademark Office